United States Patent

[11] 3,633,410

[72] Inventor Afanasy Alexanderovich Isaev
Kolpino, ul. Volodarskogo, 12 kv. 2,
Leningrad, U.S.S.R.
[21] Appl. No. 64,065
[22] Filed July 24, 1970
[45] Patented Jan. 11, 1972
Continuation of application Ser. No.
740,309, May 26, 1968, now abandoned.
This application July 24, 1970, Ser. No.
64,065

[54] DEVICE FOR MEASURING THE MAXIMUM PRESSURE IN THE INTERNAL COMBUSTION ENGINE CYLINDERS
5 Claims, 1 Drawing Fig.
[52] U.S. Cl............................................. 73/115, 73/116
[51] Int. Cl........................................... G01m 15/00
[50] Field of Search............................ 73/115, 116, 119, 119 A

[56] References Cited
UNITED STATES PATENTS
2,382,547 8/1945 De Juhasz.................. 73/115
2,392,581 1/1946 De Juhasz.................. 73/115

Primary Examiner—Richard C. Queisser
Assistant Examiner—Marvin Smollar
Attorney—Waters, Roditi, Schwartz & Nissen ABSTRACT: An apparatus for measuring maximum pressure in the cylinder of an internal combustion engine includes two primary chambers, in each of which is shiftably mounted a valve. The valves act to control the direction of flow of a controlled pressurized medium introduced into one of the primary chambers, and the direction of flow of a pressurized medium to be measured when introduced into the other chamber from the cylinder of an internal combustion engine.

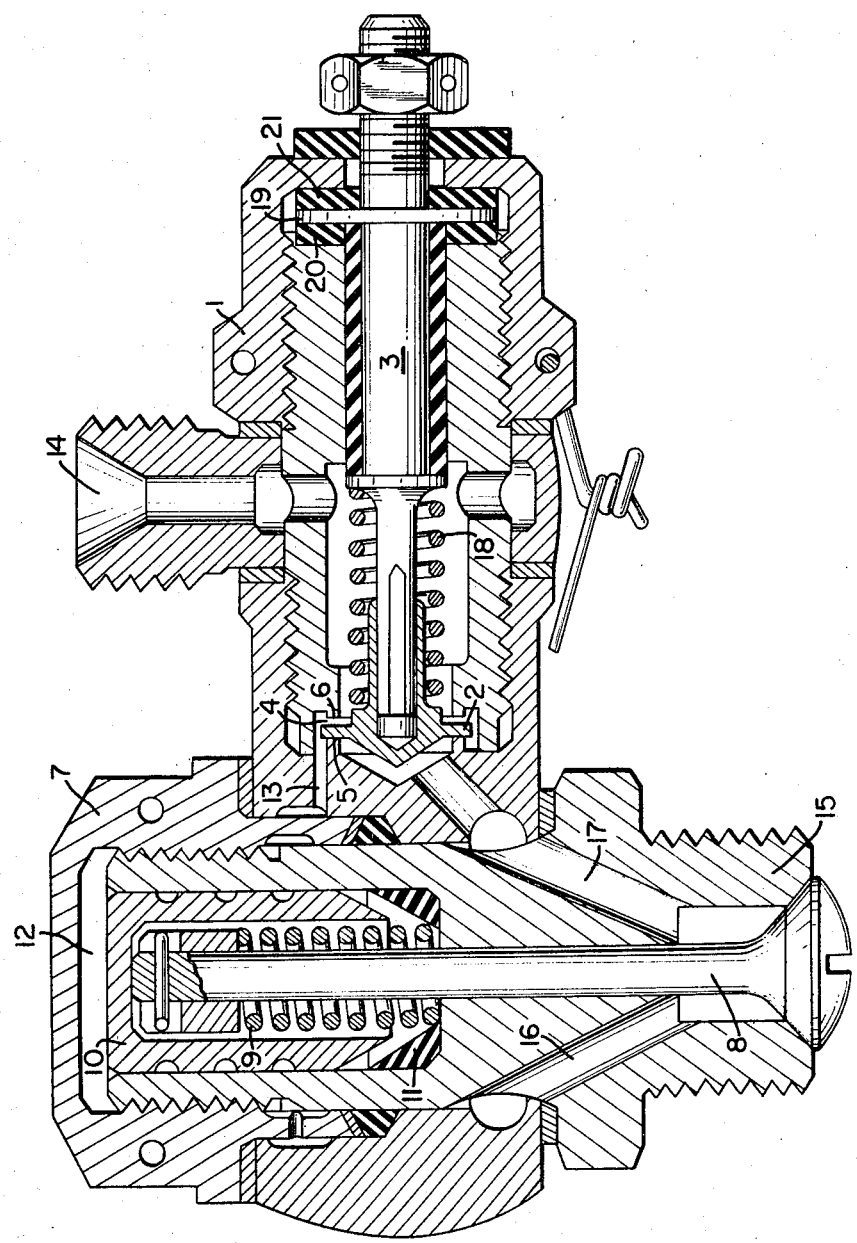

DEVICE FOR MEASURING THE MAXIMUM PRESSURE IN THE INTERNAL COMBUSTION ENGINE CYLINDERS

CROSS-RELATED APPLICATION

This application is a streamlined continuation of my earlier application Ser. No. 740,309 filed June 26, 1968 and now abandoned.

BRIEF SUMMARY OF THE INVENTION

This invention relates to devices for measuring pressure, and more specifically it relates to devices for measuring the maximum pressure in multicylinder internal combustion engines during their tuning and calibration.

Known in the art are maximum pressure gauges for checking powerful low-speed engines and which are connected to the engine only at the time of measurement.

Bulky as they are, electropneumatic indicators for remote pressure measurements in high-speed engines cannot be installed on each and every cylinder of a multicylinder engine since they have to be water cooled and, being short lived, are unfit for regular periodic pressure measurements during prolonged engine tests, whether on a stand or in operation.

It is, therefore, an object of the present invention to provide a compact device for remote pressure measurements in multicylinder engines at any time during tests or during operation.

Another object of the invention is to provide a device which does not require water cooling and has a long service life.

With these and other objects in view, the invention provides a measuring device to be permanently mounted on the engine and which lasts at least as long as the engine proper. If there is no necessity of taking measurements regularly over long intervals, the device can be installed on the engine temporarily, during adjustment.

A shutoff means is provided between the measuring device and the engine for operation only during measurement. At other times, the measuring device does not function and is not subjected to the action of hot gases.

BRIEF DESCRIPTION OF THE DRAWING

The sole FIGURE of the drawing is a longitudinal sectional view through a device for measuring maximum pressure in a cylinder of an internal combustion engine.

DETAILED DESCRIPTION

The device comprises a body 1 of an indicator containing a throwover valve 2 mounted on a spring-loaded rod 3. The valve 2 can move in chamber 4 between seats 5 and 6 and prevent the flow of gases from the engine cylinder into a pipe connected to the pipe union 14 or, conversely, the flow of compressed air from the pipe into the engine cylinder.

A counterpressure air pipe (not shown) containing a pressure gauge is connected to the pipe union 14. One shutoff valve connects the air pipe to a cylinder containing compressed air, and another valve connects the air pipe to the atmosphere. As will be seen later, the pressure of the compressed air supplied to the pipe union 14 will serve as a measure of the pressure of the engine gases when the valve 2 is in a position of equilibrium between seats 5 and 6.

The body 1 is coupled with a shutoff unit 7 having a return valve 8 loaded by a spring 9 and closing the access of gases from an engine cylinder (not shown) through the head (inlet pipe union) 15 into channels 16 and 17. The head 15 is threaded and serves as a coupling means for connection to the engine for supply of gases therefrom to channels 16 and 17 when valve 8 is opened.

Piston 10 serves for moving the valve 8 to its open position. At the end of its stroke, the piston 10 bears against a sealing ring 11, thus sealing the chamber 12 from the channels 16 and 17.

The chamber 12 of the shutoff unit communicates with the chamber 4 of the indicator by means of channel 13.

The device functions as follows:

When no compressed air is supplied to the pipe union 14, the return valve 8 is kept closed by the spring 9, closing the inlet opening in the head 15 and the throwover valve 2 is pressed against its seat 5 by the action of spring 18 on rod 3.

To measure the pressure in the engine, compressed air is fed to the pipe union 14. The air flows into the chamber 12 from the chamber 4 through the channel 13. The piston 10 moves to its bottom position, opens the return valve 8 and prevents the flow of air from the chamber 12 into the engine cylinder and channels 16 and 17 by means of the sealing ring 11.

After opening of the return valve 8, the gases from the engine cylinder will flow through the channels 16 and 17 and throw the valve 2 over from seat 5 and 6 because of the difference between the changing pressure in the cylinder and the counterpressure supplied to the pipe union 14. The chamber 4, therefore, will alternatively communicate with the counterpressure pipe 14 and with the engine cylinder.

The magnitude of the counterpressure is varied until the movement of valve 2 stops. When this occurs, the counterpressure indicated by a pressure gauge in the pipe connected to union 14 will correspond to the magnitude of the maximum compression in the engine cylinder.

After determining the magnitude of the maximum pressure in the engine cylinder, the air from the pipe leading to the pipe union 14 is exhausted to the atmosphere. The return valve 8 will then close, and the throwover valve 2 will return to its initial position.

As is conventional, when the magnitude of the maximum compression is being determined in a cylinder, the supply of fuel to this cylinder is preferably shut off.

Because the valve 2 is continuously protected by the closure of valve 8 when the device is not operated, the device can be permanently connected to the engine and utilized at any time to determine pressure in the cylinder without any danger of adverse action of the combustion gases on valve 2.

The mounting of rod 3 in body 1 is shown in the drawing as being made by sandwiching a washer 19, integral with rod 3, between resilient elements 20 and 21. Such construction is not a part of the invention but is given merely by way of example.

The device according to the present invention can be used in the course of engine tuning and calibration not only for internal combustion engines, but also piston compressors and other similar machines.

What is claimed is:

1. Apparatus for measuring pressure in an engine cylinder, said apparatus comprising a housing, coupling means on said housing for connecting said housing to said engine cylinder, a first valve member shiftably supported in said housing and communicating through said coupling means with said engine cylinder for controlling outflow of pressurized fluid from said cylinder, a second valve member shiftably supported in said housing, means for supplying a controlled pressurized fluid at a determined pressure to said second valve member, means communicating said first valve member with said second valve member for channeling the flow of said controlled pressurized fluid from the second to the first valve member, said second valve member having a first position in which said controlled pressurized fluid can pass to the first valve member and a second position in which flow of said controlled pressurized fluid is blocked and prevented from reaching said first valve member, said first valve member having a closed position, means for urging said first valve member to said closed position for blocking the outflow of pressurized fluid from said engine cylinder to thereby protect said second valve member from adverse environmental conditions in said engine cylinder when the apparatus is unemployed for measuring pressure in the cylinder, said first valve member having an open position for passing the outflow of pressurized fluid from the engine cylinder to the second valve member in opposition to the controlled pressurized fluid, said first valve member being movable to said open position in response to the pressure of said controlled pressurized fluid when the apparatus is employed for measuring pressure in the cylinder, said second valve member being shiftable between said first and second positions thereof in response to the outflow of pressurized fluid from said engine cylinder and the controlled pressurized fluid supplied thereto, said second valve member having a position of equilibrium between said first and second positions thereof, said second valve member being movable into said position of equilibrium when the pressure of the outflow of pressurized fluid from said engine cylinder is substantially equal to that of the controlled pressurized fluid.

2. Apparatus as claimed in claim 1 wherein said means communicating said first valve member with said second valve member is provided with a first chamber wherein said first valve member is movable, a second chamber wherein said second valve member is movable, and a channel communicating said first chamber with said second chamber, and including first and second sealing seats supported in said second chamber and between which seats said second valve member is movable from said first to said second positions to engage one or the other of said seats respectively, said second valve member when in said second position engaging said second seat and acting to block the flow of said controlled pressurized fluid from said second chamber to said channel.

3. Apparatus as claimed in claim 2, including resilient means biasing said second valve member toward said first seat and said first position.

4. Apparatus as claimed in claim 3, including a piston coupled with said first valve member, said piston being subjected to the controlled pressurized fluid supplied from said second valve member.

5. Apparatus as claimed in claim 4, including a third sealing seat, said third sealing seat being mounted in said first chamber and engageable by said piston to block said controlled pressurized fluid from passing from said first chamber to said cylinder.

* * * * *